United States Patent [19]

Stiff et al.

[11] 3,722,051
[45] Mar. 27, 1973

[54] METHOD OF MAKING A RADIAL BEARING CONTAINING END-LOADED FILAMENTS

[75] Inventors: Bernard G. Stiff, Lynnfield; Thomas M. Finelli, North Andover, both of Mass.

[73] Assignee: Avco Corporation, Cincinnati, Ohio

[22] Filed: Feb. 14, 1972

[21] Appl. No.: 226,344

Related U.S. Application Data

[62] Division of Ser. No. 65,646, Aug. 20, 1970, Pat. No. 3,675,980.

[52] U.S. Cl. ...... 29/149.5 NM, 29/149.5 PM, 29/419, 308/238
[51] Int. Cl. .................... B21d 53/10, B23p 17/00
[58] Field of Search .............. 29/149.5 PM, 149.5 NM, 29/149.5 R, 149.5 DP, 420, 420.5, 419; 308/238

[56] References Cited

UNITED STATES PATENTS 2,560,134  7/1951  Schroeter ................. 29/149.5 NM X
2,607,982  8/1952  Hack et al. ............... 29/149.5 PM X

*Primary Examiner*—Thomas H. Eager
*Attorney*—Charles M. Hogan et al.

[57] ABSTRACT

The invention is directed to a method of making a radial bearing wherein filaments are wound diametrically across turns of an expanded helix. When each turn of the helix is completely covered with filaments, the helix is compressed and compacted. A shaft passage is then formed through the center of the helix to form the bearing.

1 Claim, 5 Drawing Figures

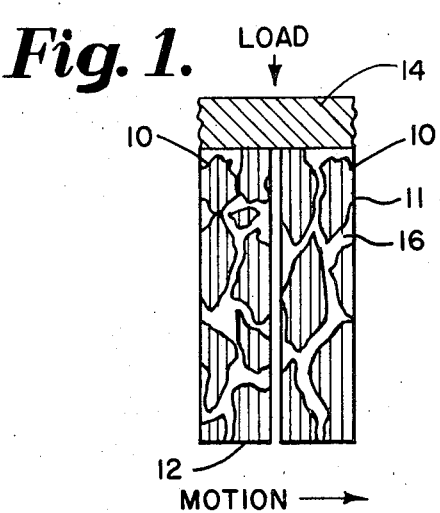
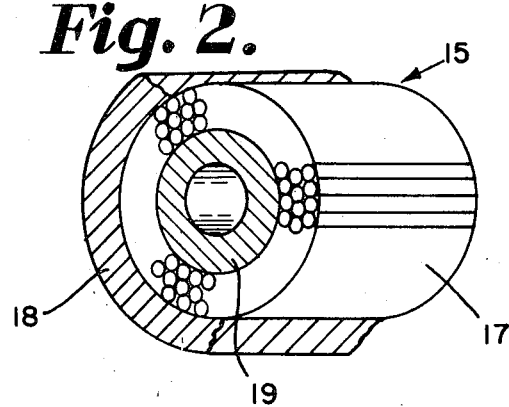
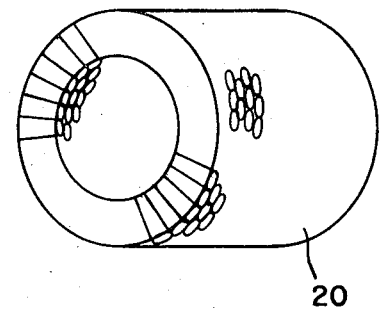
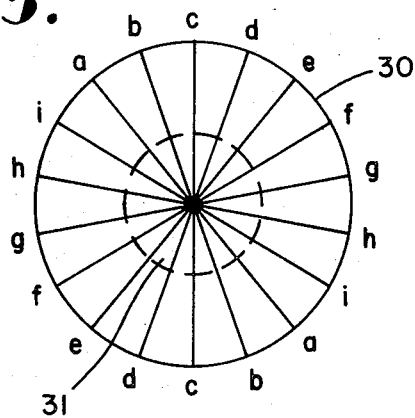
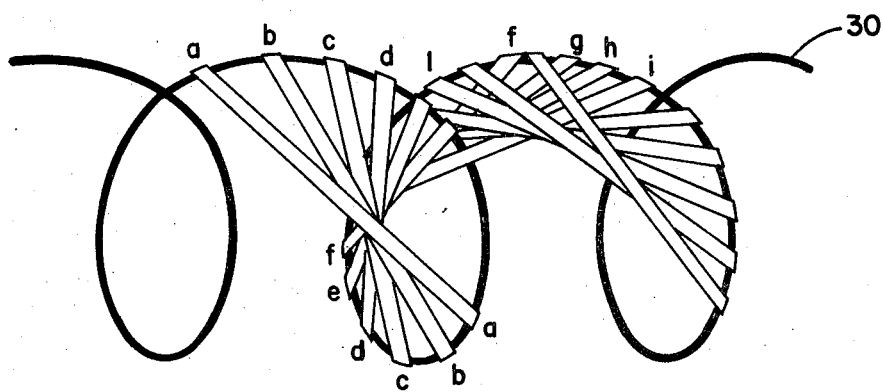

METHOD OF MAKING A RADIAL BEARING CONTAINING END-LOADED FILAMENTS

This invention is a division of the parent case entitled "A Bearing," Ser. No. 65,646, filed Aug. 20, 1970, now U.S. Pat. No. 3,675,980.

Heretofore, bearings have been constructed out of block carbon-graphite materials. Bearings have also been constructed of carbon-graphite filament composites. Heretofore, some of these composites have been formed so that the filaments are end loaded. However, on composites the graphite, at most, formed up to 50 or 55 percent of the composite bearing surface.

It is an object of the invention to provide a method of making a bearing consisting of end-loaded filaments.

It is yet another object of the invention to provide a method of making an end-loaded graphite filament bearing where the filament contains graphite crystals with their slip planes oriented longitudinally.

It is yet another object of the invention to provide a method of making an end-loaded carbonaceous filament bearing with an ability to handle exceptionally high pressure velocity product.

It is still another object of the invention to provide a method of making an end-loaded carbonaceous filament bearing consisting of carbonaceous filaments forming a mass of at least 70 percent of the theoretical density of the graphite fibers.

It is still another object of the invention to provide a method of making an end-loaded carbonaceous filament bearing which avoids the disadvantages and limitations of prior art carbon-graphite bearings.

It is still another object of the invention to provide a method of making a bearing having anisotropic thermal expansion characteristics such that the bearing remains secured in its housing at high temperatures.

It is still another object of the invention to provide a method of making a porus carbonaceous bearing.

It is yet another object of the invention to provide a method of making an end-loaded graphite filament bearing having oriented crystallites so that the coefficient expansion of the graphite may be matched to the non-carbon complementary members of the bearing such as housings and shafts.

It is a further object of the invention to provide a method of making a graphite bearing consisting essentially of graphite filaments which includes protective means against overheating.

The invention also covers a bearing having anisotropic thermal expansion properties.

In accordance with the invention, a carbonaceous bearing consists of carbonaceous filaments arranged in a side by side relationship to form a mass which is at least 70 percent of the theoretical density of carbon, the bearing surface is defined by the terminal cross sectional surfaces of the said filaments.

Also, in accordance with the invention, a method of making a radial bearing of end-loaded filaments comprises the steps of expanding a wire helix axially and covering the entire surface formed by one turn of said helix with graphite filaments disposed diametrically across said surface. When the turns of the helix are covered with filaments, the helix is compressed axially to form a plurality of contiguous disk-like surfaces with filaments radially oriented and compacted in a high density configuration. A shaft passage is then formed through said covered surfaces.

The novel features that is considered characteristic of the invention are set forth in the appended claims; the invention itself, however both as to its organization and method of operation, together with additional objects and advantages thereof, will best be understood from the following description of a specific embodiment when read in conjunction with the accompanying drawings, in which:

FIG. 1 is a schematic representation of a pair of graphite filaments with crystallites aligned longitudinally;

FIG. 2 is a schematic representation of a thrust bearing containing axially aligned carbonaceous filaments;

FIG. 3 is a schematic representation of a radial bearing with axially aligned carbonaceous filaments;

FIG. 4 is a schematic representation of an expanded right circular helix showing diametrically disposed carbonaceous filaments; and FIG. 5 is a schematic representation of the surface formed by one turn of the helix covered with diametrically disposed filaments.

Heretofore, carbon-graphite bearings were formed largely from block material. At the outset if should be made clear that carbon and graphite are not the same. Carbon is an amorphous substance, showing very little or no crystalline structure and, generally, is the precursor material for graphite. Graphite is a crystalline material formed by heating carbon to a very high graphitizing temperature. The term carbonaceous is a generic designation covering carbon and graphite, mixtures of carbon and graphite or other forms thereof. Unless one deliberately sets out to form a graphitic material with crystals of a particular unidirectional orientation, the crystals in commercially available graphite come randomly oriented.

The preferred form of obtaining and using carbonaceous filaments for this application is in a yarn or roving.

A number of important characteristics result from orienting the crystals in graphite. The properties of the materials become anisotropic.

Broadly, the invention is directed to a bearing made up of end-loaded carbonaceous filaments in a side by side relationship. The filaments are highly compacted so that accumulation of the ends of these filaments form a mass having a density which is at least 70 percent of the theoretical density of the filament material.

The resulting structure is porous. There is adequate paths for forcing fluids, oils or gas for example, through the carbonaceous mass to the bearing surface. The impregnated mass provides effective cooling via transpiration. Coolant used to cool may be continuously replaced through the carbonaceous mass from a remote reservoir.

The emphasis is placed on the filament ends since, as will be pointed out, there may be structures, such as the radial bearing, having regions remote from the bearing surface having a density of less than 70 percent. These so-called low density non-bearing regions may be impregnated with a matrix material, such as a resin or other filaments, or remain porous.

End-loaded carbonaceous filaments in a 70 percent or greater density configuration can handle higher PV (Pressure-Velocity product) values than is attainable with conventional bearing material. For example, Table 1 provides comparative data of bearing materials tested under continuous service of 10,000 hours. The PV values listed resulted in equal wear for the bearing materials listed.

TABLE 1

| Material | PV-Value |
| --- | --- |
| Bronze | 25,000 |
| Iron | 25,000 |
| Aluminum | 25,000 |
| Bronze impregnated with graphite | 30,000 |
| Bulk carbon-graphite | 15,000 |
| Bulk carbon-graphite impregnated with resin | 12,000 |
| Bulk carbon-graphite impregnated with boron | 15,000 |
| End-loaded carbon filaments | 100,000 |

Referring to FIG. 1 where there is shown a pair of graphite filaments 10 in a side by side relationship in a schematic bearing environment, each filament contains a plurality of crystallites 11 each of which is made up of highly oriented carbon crystals. The crystallites 11 are diagrammatically shown elongated longitudinally to indicate a substantially unidirectional orientation of the carbon crystals so that their slip planes are longitudinally oriented.

The filaments 10 are arranged so that they are end-loaded by the simulated motion. Wear occurs longitudinally. The heat generated at the interface of a bearing surface 12 — formed from the terminal cross sectional surface — is conducted along the filaments to a heat sink 14 which is typically the bearing housing. The spaces 16 between the crystallites 11 in the filaments 10 are pores and/or elemental carbon, primarily carbon however.

Preferably the filaments 10 have a diameter of 0.0004 inches. The true criteria for selecting a filament diameter rests in the user's ability to achieve a minimum density of at least 70 percent as heretofore specified. Generally, large diameter filaments have a poor stacking factor. While smaller diameter filaments stack efficiently to provide higher density masses, extremely fine filaments are virtually impossible to handle at the present time.

In FIG. 2 a thrust bearing 15 is shown. The bearing is based on the principle of loading the ends of the filaments in accordance with this invention. The first bearing of the type that would normally be slipped onto a rotating shaft. Hence, it is an annulus in cross section. A typical thrust bearing 15 is comprised of three concentric rings: an outside tensile ring 18, an inside compression ring 19, and the bearing annulus 17 in the middle.

The filaments in the FIG. 2 thrust bearing are in a parallel relationship forming the right circular cylinder 17. The cylinder 27 has typically a uniform structure and, in accordance with this invention, a density equal to at least 70 percent of the theoretical density of the carbonaceous material used.

One technique for compacting the annulus 17 is to expand the diameter of the inside ring 19 until the filaments are pressed very closely together against the outer tensile ring 18. In the event the inside ring 19 has been forced to exceed its own yield point, the entire assembly will remain fixed in the expanded position. In the alternative, the inside ring 19 may be kept in compression by forcing a plug into the hole of the inside ring to maintain the stretched position. Such an assembly can now be cut to length, ground, and made to be a very cheap method of manufacture.

A radial bearing 20 which also uses the end loading characteristics is shown in FIG. 3. In this design, radial elements are arrayed as spokes in a wheel. As in any wheel, the spokes become wider apart as they proceed outwardly towards the rim of the wheel. The opposite is true, of course, as the spokes come in towards the wheel axial. In the radial bearing 20 the spokes actually touch each other at the bearing surface. There is no inner hub included in the bearing, however, since the rotating shaft serves this purpose. The inner diameter of the bearing (where the filament ends touch each other) is the surface that takes the radial load when the radial bearing is slipped onto the rotating shaft. The ends form a mass having a density of 70 percent of the density of the filaments.

One of the best known characteristics of a graphite crystal is its low coefficient of friction. This is best observed when the crystalline material is rubbed by another surface in the longitudinal direction parallel to the crystal planes. A single graphite crystal has shear characteristics similar to a pack of cards, and it deforms under load in much the same manner. The slip planes in the crystal can be made to run in the direction of the yarn. Such is the case in FIG. 1 where the predominant crystal orientation is along the direction of the filament.

The coefficient of friction of the crystal in the lateral direction (crosswise to the plane of slip) is much higher, however. Very little slippage of the planes takes place and the wear action becomes a different phenomenon. The values of the friction coefficient are as follows: slip plane direction, 0.1; perpendicular to slip plane, 0.3.

The wear rate is, to a considerable degree, a direct indication of the removal process. The wear process is different when parallel to the crystal planes than when perpendicular to them. When the action is parallel to the crystal planes they slide easily on each other and the resulting wear rate in this direction is high. The wear rate normal to these planes is much lower since there is very little plane slippage. The basal planes slip off endwise, and the shearing action does not appear to propagate laterally from one crystal plane to another. Virtually no dust is apparent in such a wearing action.

One of the major causes of carbon-graphite bearing design mistakes for operation at elevated temperatures concerns the coefficient of expansion of the bearing material in relation to the bearing housing and the shaft. This problem is probably best exemplified in the article in *Product Engineering*, Apr. 1964.

Summarizing briefly, the high operational temperatures, the metal housing containing the carbon-graphite bearing material, and the shaft expand at a faster rate than the carbonaceous material. Very often a gap will occur between the carbon and its housing causing the carbon to rotate within its housing. Should the shaft expand sufficiently to seize the carbon bearing, there is a further tendency for the carbon to rotate within its housing. In the event such rotation does not occur, the shaft quickly destroys the surface of the carbon bearing.

The aforementioned problems are accounted for by conservative and costly designs, auxiliary cooling to prevent overheating, or design low level operational temperatures. All of the forgoing are wasteful and inefficient. These problems tend to be minimized and eliminated through the practice of the inventive concept described herein.

The bearing temperatures is a function of the rate and quantity of heat generation, the heat conductivity of the bearing, the adequacy of the heat sinks and the various heat transfer coefficients in the bearings as a whole. The most significant graphite characteristic that effects the bearing temperature is the heat transfer coefficient along the yarn parallel to the slip planes toward the heat sink. It is much higher in this direction than laterally, if, in addition to the high density packing, the graphite crystals are oriented, particularly excellent bearing temperature characteristics are achieved at very high PV values.

Referring to FIG. 1 where there is shown a pair of graphite filaments 10 in side by side relationship in a schematic bearing.

A species of the invention is to construct the bearing from graphite filaments having oriented crystallites such as those illustrated in FIG. 1. The filaments with oriented crystallites have expansion properties which makes them particularly suitable for use as bearings.

Techniques for adjusting the coefficients of expansion of the graphite filaments are well-known, as the coefficient of expansion is a function of the crystallite orientation. As the degree of crystallite orientation increases, the ratio of lateral to longitudinal coefficients of expansion can vary greatly, from as little as 3-1 to as much as 50-1 depending upon the manufacturing process that orients the crystals in the raw materials.

The ability to vary the ratio of lateral to longitudinal coefficients of expansion over such wide limits makes it possible to match the longitudinal expansion of the filaments to the housing or rotating part or both if the housing and rotating part are formed from the same material. It is clear, therefore, that the very significant and critical problem associated with the misapplication of carbon-graphite bearings in high temperature service due to its low coefficient of expansion is eliminated.

Because the oriented graphite has a higher coefficient of thermal expansion in the lateral direction than in the longitudinal direction, an end-loaded filament radial or thrust bearing of the type depicted in FIGS. 2 and 3 expand circumferentially.

The bearing surface tends to recede radially compensating for thermal expansion of the shaft preventing the shaft from seizing in the bearing. The outer diameter expands into the bearing housing and typically, will go into compression and become more firmly secured to the housing. Rotation of the bearing within its housing at high temperature is thus avoided.

Bearing materials having anisotropic thermal properties offer another benefit. Heat conduction is greatest in the direction of crystal orientation. In the case of bearings, preferred crystal orientation is perpendicular to the bearing surface. Thus heat is preferentially carried away from the bearing surface. Bearing operating temperatures are reduced.

Though the previous discussion has stressed end-loaded carbonaceous filaments for bearings, an alternative material having anisotropic thermal properties is pyrolytic graphite--see Pappas and Blum, Properties of Pyrolytic Graphite, *Journal of The American Ceramic Society*, Vol 44, No. 12, page 502.

A preferred way of making a radial bearing is illustrated in FIGS. 4 and 5. The symbol 30 identifies a right circular helix formed preferably of wire or any other suitable material. The helix 30 is expanded so that there is a space between adjacent turns of the helix. A radial filament structure is constructed by passing a filament "a" diametrically across the circle formed by one turn of the helix. A second filament "b" is also diametrically placed across the turn but adjacent to filament "a." In sequence, filaments "c," "d," "e," etc., are likewise diametrically placed across the turn as indicated until the entire surface formed by one turn of the helix is covered with diametrically placed filaments.

It is clear that the side by side filament relationship may be formed by indexing the helix 30 about its axis after each filament is placed or by maintaining the helix fixed and moving the filaments around the periphery of the helix. An over-view of a covered turn is illustrated in FIG. 5. Note that the diametrically placed filaments from a radial structure. To form the bearing the helix is then compressed axially under high pressure to form a filament mass having a density ir. excess of 70 percent of the theoretical density of the filament material. A shaft hole illustrated in phantom outline 31 is formed by conventional drilling and finishing techniques.

The various features and advantages of the invention are thought to be clear from the foregoing description. Various other features and advantages not specifically enumerated will undoubtedly occur to those versed in the art, as likewise will many variations and modifications of the preferred embodiment illustrated, all of which may be achieved without departing from the spirit and scope of the invention as defined by the following claims:

We claim:

1. A method of making a radial bearing containing and loaded filaments comprising the steps of:
   a. expanding a wire helix axially;
   b. positioning a first filament diametrically across the surface formed by one turn of said helix;
   c. indexing said helix through a predetermined angular rotation;
   d. depositing another diametric filament next to said first filament;
   e. repeat steps (c) and (d) until the entire surface is covered with filaments;
   f. compress the helix axially to form a plurality of contiguous surfaces with filaments radially oriented; and
   g. forming a passage through said surfaces.

* * * * *